United States Patent [19]

Nikitin et al.

[11] 4,429,244
[45] Jan. 31, 1984

[54] STATOR OF GENERATOR

[75] Inventors: Pavel Z. Nikitin; Tibor M. Nemeni; Lev A. Zolotov; Gennady A. Bezchastnov; Alexandr I. Nikolsky; Andrei M. Sharashkin; Albert V. Tjurin, all of Moscow, U.S.S.R.

[73] Assignee: Vsesojuzny Proektnoizyskatelsky I Nauchno-Issledovatelsky Institut "Gidroproekt", Moscow, U.S.S.R.

[21] Appl. No.: 285,106

[22] PCT Filed: Sep. 29, 1980

[86] PCT No.: PCT/SU80/00172
§ 371 Date: Jul. 16, 1981
§ 102(e) Date: Jul. 16, 1981

[87] PCT Pub. No.: WO81/01775
PCT Pub. Date: Jun. 25, 1981

[30] Foreign Application Priority Data

Dec. 6, 1979 [SU] U.S.S.R. .............................. 2843451

[51] Int. Cl.³ .............................................. H02K 1/12
[52] U.S. Cl. .................................................... 310/254
[58] Field of Search ................................ 310/254, 45

[56] References Cited

U.S. PATENT DOCUMENTS 2,749,456  6/1956  Luenberger .................... 310/45 X
3,743,867  7/1973  Smith ................................. 310/52
4,164,672  8/1979  Flick .................................. 310/54

FOREIGN PATENT DOCUMENTS 379014  7/1973  U.S.S.R. .

Primary Examiner—John Gonzales
Attorney, Agent, or Firm—Burton L. Lilling; Myron Greenspan; Bruce E. Lilling

[57] ABSTRACT

A stator of a generator, which stator comprises a housing accommodating a slotted magnetic core 2, a dielectric oil-separating cylinder 4 arranged next to the internal surface of the magnetic core, and a winding composed of two series-connected half-windings 7, 8, each composed, in turn, of high-voltage elements 6. The high-voltage elements 6 of one half-winding 8 in the slotted part of the stator are placed in insulation sleeves 14 which have hollow projections 15 on their internal surfaces. Placed between the hollow projections is a thermosetting compound. The part of each insulation sleeve, which extends beyond the slotted part of the stator, has a cylindrical portion integral with a cone-shaped cable-type termination reinforced with current-carrying layers.

8 Claims, 4 Drawing Figures

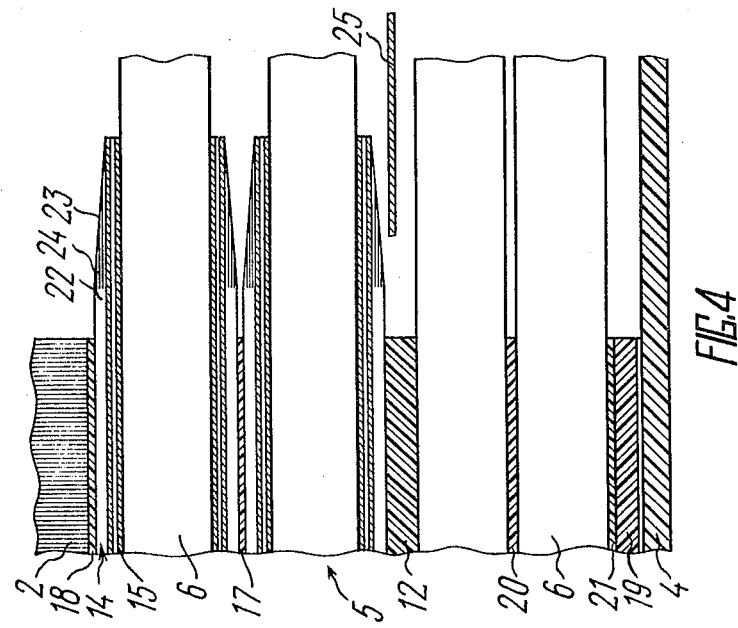
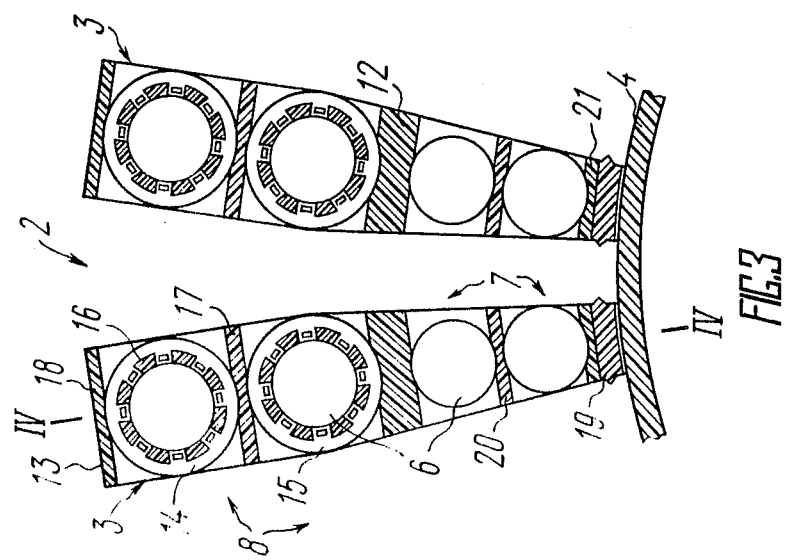

STATOR OF GENERATOR

FIELD OF THE INVENTION

The present invention relates to the manufacture of electrical machinery and, more particularly, to a stator of a generator.

PRIOR ART

The current trend in the manufacture of generators is towards increasing the unit capacity, wherefore the stator winding of a turbogenerator has to be designed for heavy rated currents (from 10 kA to 60 kA).

Considering that generator voltage is normally in the range of 15 kV to 27 kV, this means a considerable increase of the size of the stator winding bars and stator slots. It must also be pointed out that energy is transmitted from a high-power generator to a high-voltage network through a step-up transformer which is integral with the turbogenerator. The provision of a step-up transformer involves considerable expenditures moreover, while in operation, such a transformer accounts for certain power losses (cf. V. V. Titov, G. M. Khutoretsky, G. A. Zagorodnaya, G. P. Vartanian, D. I. Zaslavsky, I. A. Smotrov. Turbogenerators: Calculation and Design. Energia Publishers, Leningrad, 1967, pp. 38-45, 111-126). One of the ways to raise voltage across the stator winding is to manufacture the stator winding from high-voltage cable.

Of all the known generator stators, the closest to the one of the present invention is the stator of a water-and-oil-cooled generator developed in the USSR (cf. L. P. Gnedin, Ya. V. Danilevich, K. N. Maslennikov, K. F. Potekhin, V. F. Chirikov, N. I. Shkolnikov, A. K. Shadrintsev. "Water-and-Oil-Cooled Turbogenerator TVM-300". J. Electrotechnika, No. 1, 1970, pp. 6–8).

This stator comprises a housing which accommodates a slotted magnetic core of laminated steel, a dielectric oil-separating cylinder arranged next to the internal surface of the magnetic core, and a winding composed of high-voltage elements with oil-and-paper insulation, which elements are arranged in the slots and secured by wedges. The insulation of all the high-voltage elements of the winding is designed for maximum phase voltage. Voltage across those high-voltage elements which are close to the zero potential point is lower than maximum phase voltage, wherefore these elements may have a thinner insulation layer.

The stator under review is disadvantageous in that it requires much insulation. The insulation must be very thick, especially when voltage across the stator winding is upwards of 110 kV. This means that the bars have to be internally cooled; however, the feeding of a coolant necessitates a great number of intermediate electric connections in the end winding zones.

The thick insulation means an increased curvature radius of the bars, which, in turn, accounts for an increased size of the end winding coils.

DISCLOSURE OF THE INVENTION

It is an object of the present invention to provide a stator of a design that would make it possible to reduce the amount of insulation and the number of electric connections in the end winding.

The invention, thus, resides in providing a stator of a generator, which stator comprises a housing accommodating a slotted magnetic core of laminated steel, a dielectric oil-separating cylinder arranged next to the internal surface of the magnetic core, and a winding composed of high-voltage elements divided by spacers, arranged in the slots and secured by wedges, the stator being characterized, according to the invention, in that the winding is composed of two half-windings placed in series and separated by an oil-separating spacer, the high-voltage elements of one of the half-windings, arranged in the stator slots, being accommodated in insulation sleeves having hollow projections on their internal surfaces with a thermosetting compound placed between said hollow projections, the part of each insulation sleeve, which extends beyond the stator slot, having a cylindrical portion and a cone-shaped cable-type termination of a predetermined size, reinforced with current-carrying layers, said cylindrical portion being integral with said cable-type termination.

It is preferable that the current-carrying layers should be made of foil.

The current-carrying layers can also be made of metal mesh.

These layers can be produced by deposition of a current-carrying material.

It is expedient that the high-voltage elements, accommodated in insulation sleeves, should be interposed between the bottom of the slot and the oil-separating spacer.

The use of the present invention ensures a substantial reduction of power losses through longer periods between overhauls. This is due to increased reliability of the stator's end winding, which, in turn, is due to fewer end winding connections. In addition, the manufacture of the stator according to the invention requires less insulation than the manufacture of conventional stators. The manufacture of the stator housing requires less structural steel because of a reduced size of the end winding zones.

BRIEF DESCRIPTION OF DRAWINGS

Other objects and advantages of the present invention will become more apparent from a consideration of the following detailed description of a preferred embodiment thereof, taken in conjunction with the accompanying drawings, wherein:

FIG. 3 is a view in the direction of the arrow N of the area M of FIG. 1;

FIG. 4 is a section taken on line IV—IV of FIG. 3.

BEST MODE FOR CARRYING OUT THE INVENTION

Figures 1, 2:
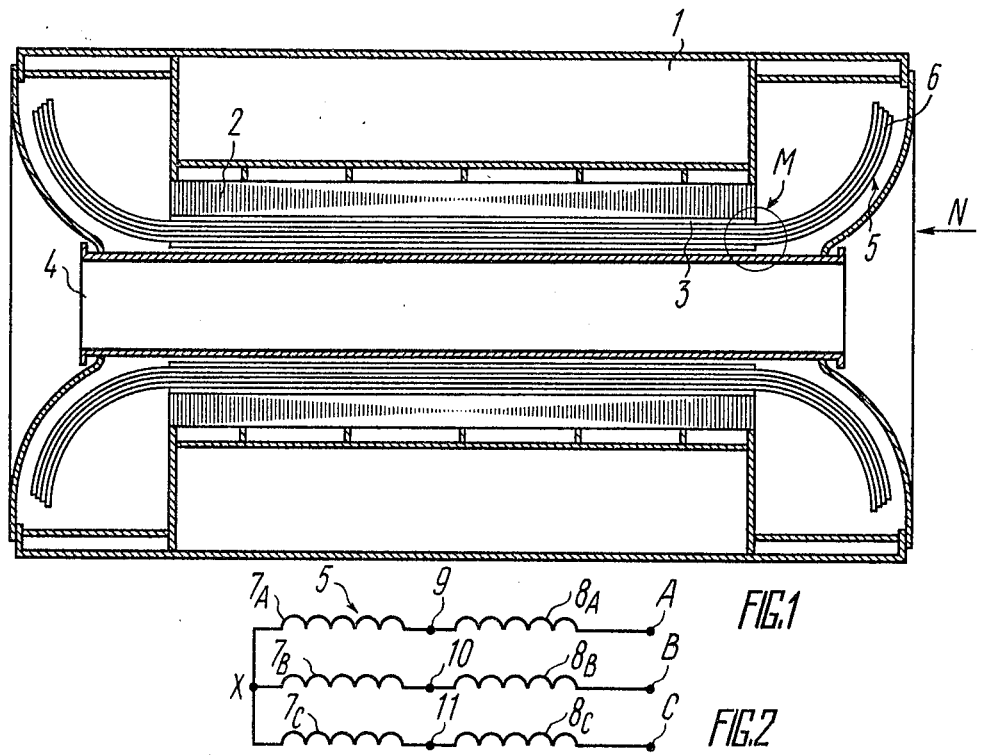
FIG. 1 is an elevation view of a generator stator in accordance with the invention.
FIG. 2 is a circuit diagram of the stator winding in accordance with the invention.

Referring now to the attached drawings, the stator according to the invention comprises a housing 1 (FIG. 1) which accommodates a magnetic core 2 of laminated steel, provided with slots 3, a dielectric oil-separating cylinder 4 arranged next to the internal surface of the magnetic core 2, and a winding 5 composed of high-voltage elements 6 arranged in the slots 3.

The winding 5 (FIG. 2) is a three-phase winding. It consists of two half-windings, $7_A$, $7_B$, $7_C$ and $8_A$, $8_B$, $8_C$, connected in series at points 9, 10 and 11. The points A, B and C are leadouts of the stator.

FIG. 3 is a view taken in the direction of the arrow N of the area M of FIG. 1, showing two adjacent slots 3 of the stator. Each of these slots 3 accommodates four elements 6 of the winding 5. Each element 6 of the winding 5 is a portion of the winding 5 placed in the stator slot. The half-windings 7 and 8 are separated by an oil-separating spacer 12.

The elements 6 are interposed between a bottom 13 of the slot 3 and the oil-separating spacer 12 and make up the half-winding 8 (FIG. 2) the elements 6 are accommodated in insulation sleeves 14 (FIG. 3) which have hollow projections 15 on their internal surfaces. The space between two adjacent hollow projections 15, the internal surface of the sleeve 14 and the surface of the element 6 accommodates a thermosetting compound. The sleeves 14 are separated from one another by a spacer 17, and are separated from the bottom 13 of the slot 3 by a spacer 18.

The elements 6 between the oil-separating spacer 12 and a wedge 19 constitute the half-winding 7 (FIG. 2) and are separated from one another by a spacer 20 (FIG. 3); they are separated from the wedge 19 by a spacer 21.

The part of each insulation sleeve 14 (FIG. 4), which extends outside the stator slot, comprises a cylindrical portion 22 and a cone-shaped cable-type termination 23 of a predetermined size, reinforced with current-carrying layers 24. The cylindrical portion 22 is integral with the cable-typetermination 23.

The current-carrying layers 24 may be of foil or metal mesh. They can also be produced by deposition of a current-carrying material.

For greater electric strength of the stator, the elements 6 of the half-windings 7 (FIG. 2) and 8 beyond the stator slots are separated by an oil-separating barrier 25 (FIG. 4).

In the embodiment under review, the high-voltage elements 6 of the winding 5 are single-layer or multi-layer high-voltage cylindrical cables.

The half-windings 7 (FIG. 2) and 8 are placed in series so that each takes only one half of phase voltage, $U_{1/2}$. This makes it possible to reduce by half the thickness of the insulation of the winding element 6 (FIG. 3).

Let it be assumed that the voltage across the turns of the half-winding 7 (FIG. 2) with respect to the zero potential point X is in the range of 0 to $U_{1/2}$; in such a case voltage across the turns of the half-winding 8 with respect to point X is in the range of $U_{1/2}$ to $U_1$.

The insulation of the half-winding 8 is designed for voltage $U_{1/2}$; this means it must be additionally insulated from the zero potential surface. To achieve this end, the elements 6 (FIG. 3) of the half-winding 8 are placed in the insulation sleeves 14. The current-carrying layers 24 (FIG. 4) make it possible to produce a slightly nonuniform electric field which eliminates the possibility of a flow of current from the surfaces of the elements 6 of the half-winding 8, which extend beyond the cone-shaped cable-type terminations 23 of the sleeves 14, to the nearest metal surfaces of the stator.

The use of the insulation sleeves makes it possible to dispense with insulating all the stator winding elements from the stator housing. Thus the manufacturer can save substantially on the insulation material.

The reduction of the insulation thickness by half makes the outer cooling of the cables alone quite sufficient. This also means a much shorter coolant path. The coolant flows along parallel paths of an equal length; the length of each path is equal to the axial length of the generator. It must be reminded in this connection that in the case of internal cooling the length of the coolant path is about equal to the axial length of the generator multiplied by the number of successively cooled cable portions. Thus the invention allows a substantial reduction of the coolant inlet points, which means a reduced number of end winding connections. One phase of the stator winding can be produced with only one or two end winding connections. This considerably facilitates the manufacture of the stator winding, keeping in mind that in the case of conventional stators it takes much time to produce and solder the end winding connections, especially when the winding is designed for high voltage and each end winding connection is a coupling box. In addition, the invention considerably improves the reliability of stators, considering that soldered connections are most failure prone.

To summarize, the invention reduces expenses involved in the manufacture of stators, makes the manufacture of stators less material-consuming, and improves the reliability of generators.

INDUSTRIAL APPLICABILITY

The invention is applicable to the manufacture of high-power generators and turbogenerators for steam and nuclear power stations.

We claim:

1. A stator of a generator, comprising a housing accommodating a slotted magnetic core of laminated steel, a dielectric oil-separating cylinder arranged next to the internal surface of said magnetic core, and a winding composed of high-voltage elements divided by spacers, arranged in the slots and secured by wedges, characterized in that the winding is made of two half-windings 7, 8 placed in series and separated by an oil-separating spacer 12, the high-voltage elements 6 of one of the half-windings, arranged in the stator slots, being accommodated in insulation sleeves 14 having hollow projections 15 on the internal surfaces thereof with a thermosetting compound placed between said hollow projections, the part of each insulation sleeve 14, which extends beyond the stator slot, having a cylindrical portion 22 and a cone-shaped cable-type termination 23 of a predetermined size, reinforced with current-carrying layers 24, said cylindrical portion being integral with said cable-type termination.

2. A stator as claimed in claim 1, characterized in that the current-carrying layers 24 are made of foil.

3. A stator as claimed in claim 1, characterized in that the current-carrying layers 24 are made of metal mesh.

4. A stator as claimed in claim 1, characterized in that the current-carrying layers 24 are produced by deposition of a current-carrying material.

5. A stator as claimed in any claim from 1, characterized in that the high-voltage elements 6 in the insulation sleeves 14 are interposed between the bottom 13 of the slot 3 and oil-separating spacer 12.

6. A stator as claimed in claim 2, characterized in that the high-voltage elements 6 in the insulation sleeves 14 are interposed between the bottom 13 of the slot 3 and oil-separating spacer 12.

7. A stator as claimed in claim 3, characterized in that the high-voltage elements 6 in the insulation sleeves 14 are interposed between the bottom 13 of the slot 3 and oil-separating spacer 12.

8. A stator as claimed in claim 4, characterized in that the high-voltage elements 6 in the insulation sleeves 14 are interposed between the bottom 13 of the slot 3 and oil-separating spacer 12.

* * * * *